United States Patent Office 3,654,142
Patented Apr. 4, 1972

3,654,142
REGENERATION OF PLATINUM-RHENIUM
REFORMING CATALYST
Vincent J. Moravec, Jr., 1315 Nasa Road 1, Apt. 263
77058, and William K. Meerbott, 3006 Winslow 77025,
both of Houston, Tex.
Filed July 29, 1970, Ser. No. 59,246
Int. Cl. B01j 11/02, 11/18; C10g 35/06
U.S. Cl. 208—140                6 Claims

ABSTRACT OF THE DISCLOSURE

The activity and stability of a deactivated reforming catalyst containing a platinum group metal and rhenium are restored to that of fresh catalyst by (1) removing substantially all carbon from the catalyst; (2) contacting the catalyst at about 900° F. with a non-reducing gas containing halogen, steam and oxygen until about 85% wt. of the desired halide content is added; (3) discontinuing the use of steam and oxygen from the last-mentioned step until the halogenation is completed; and (4) drying and reducing the catalyst with a hydrogen-containing gas; then reusing the catalyst in a reforming process. Preferably, the catalyst is halogenated to a level about 20% greater than that of fresh catalyst. It is also preferred that the catalyst then be dried with a non-reducing gas at about 900° F. until the water content in the exit gas is below 150 p.p.m.v. followed by reducing the metallic oxides by contact with a hydrogen-containing gas at 700–900° F.

BACKGROUND OF THE INVENTION

Field of the invention

This invention relates to a method for halogenating a reforming catalyst comprising a platinum group metal plus at least one additional metal component on a refractory oxide support. More particularly, it relates to a process for halogenating platinum-rhenium catalyst on an alumina support.

Description of the prior art

Catalysts containing as a hydrogenation component a platinum group metal and minor amounts of a second metal, such as rhenium have proved particularly effective in petroleum refining processes for the hydroconversion of hydrocarbon feeds, especially catalytic reforming processes. These catalysts are multi-functional and generally contain the hydrogenation components supported on a suitable refractory oxide support, usually alumina. Small amounts of halogen such as chlorine and/or fluorine are added to the composite to provide acid activity for acid catalyzed reactions such as dehydrocyclization and isomerization.

Catalysts containing platinum and rhenium on an alumina support have demonstrated exceptional activity and stability for catalytically reforming naphthas for the production of gasoline (see, e.g., U.S. Pat. 3,415,737—Kluksdahl). Because of the exceptional stability of these catalysts, such processes can be operated at lower pressures and lower hydrogen/oil molar ratios thereby increasing the yield and improving the capability of existing processing units. However, catalyst activity gradually declines during processing due, among other things, to the build-up of carbonaceous deposits (coke) on the catalyst and/or depletion of halogen from the catalyst. Eventually it becomes necessary to regenerate the catalyst by subjecting it to an oxidizing atmosphere to burn off the coke (see, e.g., U.S. Pat. 3,134,732—Kearby et al.). Halogen may be added to the catalyst as part of a regeneration procedure. Frequently carbon burn-off and/or halogen replenishment fail to restore the activity and stability of the catalyst to its initial level or do so only temporarily and, during subsequent use of the catalyst, activity and selectivity decrease at an accelerated rate compared to fresh catalyst. This lower activity and stability, even of a regenerated and halogenated catalyst, is commonly attributed to agglomeration or sintering of platinum metal crystallites.

Redispersal of the agglomerated or sintered platinum metal is possible and is usually accomplished by exposing the substantially coke-free catalyst, after carbon burn-off, to an atmosphere comprising halogen, steam and oxygen. Halogenation of the catalyst may also be accomplished before the carbon removal step is completed. Such a treatment gives an effective redistribution of platinum on the catalyst. Apparently this combined action of halogen, steam and oxygen converts the platinum metal into a platinum-halogen compound or complex. Consequently, after catalyst rejuvenation it is necessary to reduce the complex before re-using the catalyst in the hydrocarbon conversion process. Reduction of the platinum-halogen compound or complex to platinum metal can be effected by contacting the catalyst with a hydrogen-containing gas at high temperatures. In this manner a reforming catalyst containing only platinum as the hydrogenation component is restored to an activity and stability level equivalent to that of fresh catalyst. However, when a catalyst contains a platinum group metal and a second metal such as rhenium as a hydrogenation component, the activity and stability levels are not restored to that of fresh catalyst by the above-mentioned halogenation procedure. This difficulty could be caused by the formation of a platinum alloy which is less easily dispersed than platinum.

SUMMARY OF THE INVENTION

A regeneration procedure has now been discovered which fully restores both the activity and stability of deactivated reforming catalysts containing as a hydrogenation component a platinum group metal plus a minor amount of rhenium to a level equivalent to that of fresh catalyst. The process comprises contacting the deactivated catalyst with an oxygen-containing gas at high temperatures to effect substantially complete carbon removal, then contacting the catalyst with a non-reducing gas containing oxygen, steam and halogen at a temperature of from 800 to 1000° F. until about 85% wt. of the desired halide content has been added, discontinuing the use of water vapor and oxygen in the last-mentioned step until the desired halogen content is obtained; then drying and reducing the catalyst with a hydrogen-containing gas before reusing it in a reforming process. Preferably, the catalyst is halogenated to a level about 20% greater than that of fresh catalyst. It is also preferred that the catalyst then be dried with a non-reducing dry gas at a temperature of about 900° F. until the water content of the catalyst is below about 1.5% wt. before reducing the hydrogenation component with a hydrogen-containing gas.

DESCRIPTION OF THE DRAWING

The advantages of the invention are illustrated in the accompanying drawing. FIG. 1 and FIG. 2 both compare fresh catalyst, catalyst regenerated according to the prior art, and catalyst regenerated according to this invention. The improved halogenation process has restored the activity and stability of the catalyst to a level equal to or better than that of fresh catalyst. The operating conditions for these tests are detailed in the example described hereinafter.

DETAILED DESCRIPTION

Figure 1:
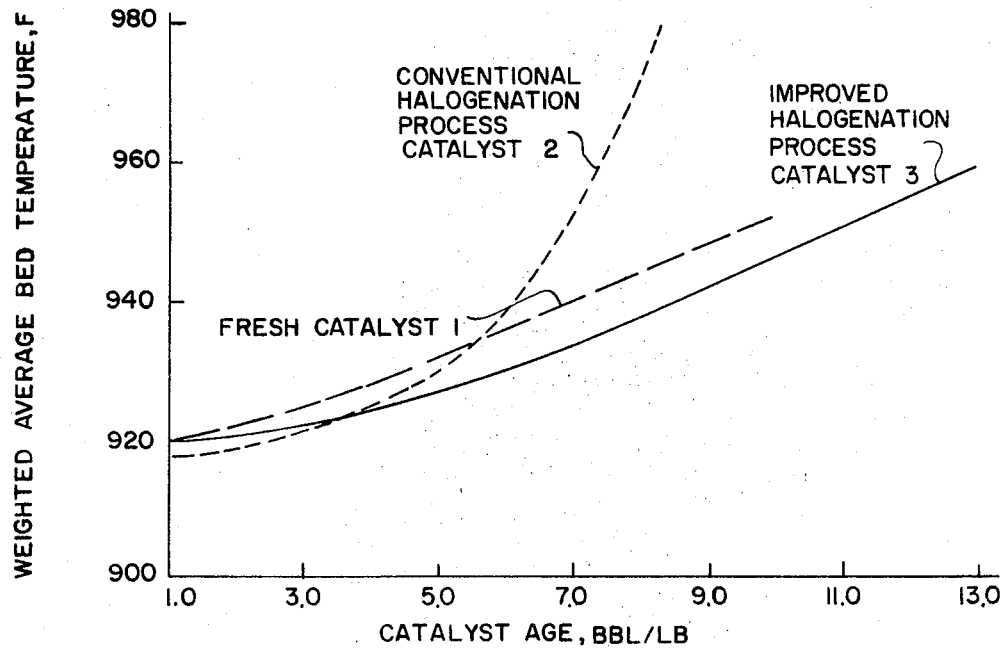
FIG. 1 is a plot of catalyst age versus bed temperature required to maintain a given conversion level which illustrates activity at any given catalyst age and the rate of activity decline.

The regeneration procedure of this invention is applicable to catalysts which contain a hydrogenation component comprising a platinum group metal, at least one additional metallic component and a halogen component. Catalyst preparation methods are not critical and are well known in the art. Platinum group metals combined with a second metal such as rhenium on a support are particularly suitable. The metals of suitable reforming catalysts generally range from 0.2 to 0.9% wt. platinum group metal and 0.01 to 5% wt. of a second metal component. The halogen content ranges from 0.1 to about 1.5% wt. Within this range fluorine concentrations generally vary from 0.0 to 0.6% wt. while concentrations of 0.6 to 1.5% wt. are typical when the halogen is chlorine. In some cases the catalyst contains both chlorine and fluorine. Usually the hydrogenation metal components and halogen are supported on a suitable carrier such as gamma-alumina although other types of refractory metal oxides may be used. Such supports may also contain small amounts of promoters or stabilizers such as phosphorus, usually as aluminum phosphate, or silica. These are especially suited for platinum-rhenium reforming catalysts.

These multi-functional reforming catalysts are especially suited for hydro-conversion processes such as dehydrogenation and dehydrocyclization of paraffins and the dehydrogenation of naphthenes. Such processes are particularly useful for upgrading the octane number of paraffinic and naphthenic hydrocarbons in the gasoline boiling range. However, such catalysts may be used to accomplish other hydroconversions such as dealkylation, ring opening of naphthenes and hydrocracking. The regeneration process of the invention is particularly effective for catalysts which are utilized in catalytic reforming.

Dehydrocyclization of paraffins to aromatics is carried out at a temperature in the range from 750 to 1200° F. and preferably from 900 to 1100° F. In general the pressure is relatviely low, ranging from subatmospheric pressure of 2 p.s.i.a. to an elevated pressure of 100 p.s.i.a. or more. Preferred pressures are in the range from 5 p.s.i.a. to 75 p.s.i.a.

Catalytic reforming conditions will vary depending on the composition of the feed and the product requirement, but temperatures range from about 750 to 1200° F. and pressures generally range from 100 to 600 p.s.i.a., preferably from 150 to 400 p.s.i.a. Low pressure tends to favor the dehydrocyclization reaction. Liquid hourly space velocities can vary over a considerable range, generally from 0.1 to 10 and preferably from 0.5 to 5. Hydrogen to oil molar ratios generally range from 2 to 1 to 12 to 1.

After a period of operation in a reforming process the catalyst loses activity as indicated by decreasing yields of $C_5+$ liquid product and increasing catalyst temperature requirement to maintain the desired conversion level. When continued operation becomes uneconomical the catalyst is usually regenerated in place by subjecting it to a free oxygen containing oxidizing atmosphere at temperatures from about 725 to 950° F. to burn off carbon deposits or "coke." Platinum catalysts may also become deactivated during use due to platinum agglomeration. For redispersal of the platinum metal a conventional hologenation procedure is employed which comprises contacting a substantially carbon-free catalyst with a non-reducing gas containing oxygen at a partial pressure of 1.5 to 2.5 p.s.i.a., steam at a partial pressure of 1.0 to 5.0 p.s.i.a. and a lower halogen (fluorine or chlorine) partial pressure of 0.05 to 0.25 p.s.i.a. at a temperature from 800 to 1000° F., and preferably at about 900° F. Such treatment results in a platinum-halogen complex or compound. It is not important what type of compound of the halogen is used; the halogen may be added as elemental gas, e.g., chlorine, a hydrogen halide or an organic halogen-containing compound such as trichloroethylene. This halogenation procedure is well known in the art (see, e.g., British Pat. No. 782,787).

Figure 2:
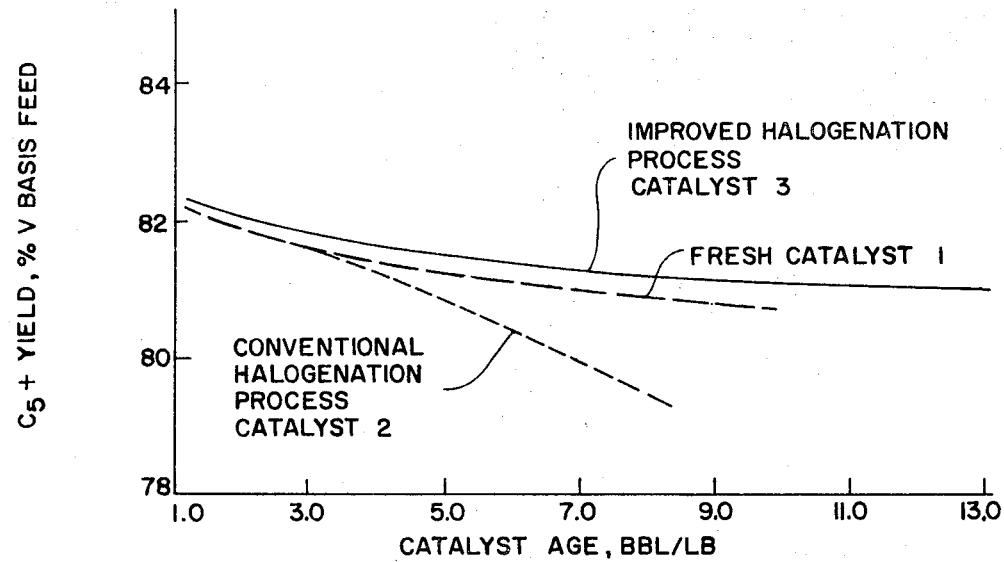
FIG. 2 is a plot of catalyst age versus yield of useful products which illustrates catalyst activity in different terms.

Surprisingly, however, when such a halogenation procedure is applied to catalysts containing platinum and rhenium, the substantially carbon-free halogenated catalyst is somewhat less active than fresh catalyst when used to process up to about 5 barrels of feed per pound of catalyst and thereafter activity declines rapidly. FIG. 1 shows that a regenerated platinum-rhenium catalyst which has been halogenated by the conventional procedure is much less stable than fresh catalyst while FIG. 2 shows that the selectivity is essentially the same as that of fresh catalyst up to about 5 barrels per pound catalyst age at which point selectivity decline is also evident. Presumably, this behavior is due to at least in part to the presence of the second metal component, possibly alloyed in part, with the platinum group metal and interfering with the platinum redispersal or otherwise modifying its function.

Any non-reducing gas or gas mixture may be used for a carrier during halogenation, for example, synthesis gas, nitrogen, air or mixtures thereof, so long as the gas does not contain known catalyst poisons such as carbon monoxide. Halogenation is suitably conducted at gas flow rates from about 50 to about 25° standard cubic feet per hour (s.c.f.h.) per pound of catalyst and preferably from 100 to 200 s.c.f.h. per pound at pressures from 50 to 500 p.s.i.a., and preferably from 100 to 250 p.s.i.a. Steam in the gas improves distribution of the halogen throughout the catalyst bed; water vapor and halogen compete for the active sites on the catalyst support. The halogen content of the catalyst can be varied by adjusting the steam/halogen molar ratio from as low as 2/1 to 200/1. Halogen is added to the non-reducing gas stream until the fresh catalyst halogen content has been restored. This step is conducted at temperatures from 800 to 1000° F. with a temperature of about 900° F. being particularly effective. Excellent results have been obtained by adding sufficient halogen to increase the catalyst halogen content to about 20% weight greater than that of fresh catalyst.

During the halogenation step with free halogen, water vapor reacts with the halogen to form oxygen and a hydrohalide by the reverse Deacon reaction, e.g.,

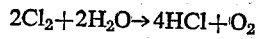

$$2Cl_2 + 2H_2O \rightarrow 4HCl + O_2$$

Thus, oxygen is present during this step even though not intentionally added. When halogenating platinum catalysts not containing an additional metal component it is usual to add the desired quantity of halogen, purge the catalyst with an inert gas to remove oxygen and then reduce the platinum oxides with a hydrogen-containing gas at temperatures from 650 to 950° F. This latter step removes excess water from the catalyst support in addition to reducing the platinum from the oxide to the elemental form. Since the system is extremely wet at the end of the halogenation step, considerable halide can be removed from the catalyst while it is being purged with inert gas to remove oxygen.

It has now been discovered that by eliminating oxygen and steam from the non-reducing gas after about 85% weight of the desired halide content has been added, the activity and stability of platinum group catalysts containing rhenium are restored to a level equal to or better than that of fresh catalyst. Where no oxygen is being added it is sufficient to stop adding steam; this eliminates the formation of oxygen. By continuing halogen addition at the same rate until the desired halogen level is reached after discontinuing water and oxygen, usually about 5 minutes, excess halogen is deposited at the front of the catalyst bed. The lower water content in the circulating nonreducing gas permits equilibration with the catalyst at a higher halogen content than would otherwise be achieved; chloride which would have been removed is retained in the catalyst bed. Finished catalysts having halide contents about 20% greater than that of fresh catalysts are particularly suitable in achieving improved stability in subsequent processing cycles. Presumably this is due at least in part to better dispersion of the platinum-rhenium crystallites.

While drying may be effected simultaneously with the metal reducing step using a hydrogen-containing gas, a preferred method is to dry the catalyst by contact with a non-reducing gas, generally the same gas used during halogenation. Reduction under wet conditions results in sintering of the platinum-metal crystallites and lower activity. Although drying may be done in one-through operation, it is more convenient to circulate the drying gas. Water from the catalyst is removed by reducing the temperature of the circulating gas in a high pressure vessel of the system, separating the water from the gas and reheating the gas before again contacting the catalyst. Suitable pressures are about 30 to 400 p.s.i.a. Lower pressures are preferred for more complete water removal at a given temperature. The catalyst is preferably dried until the water content of the catalyst is about 1.5% wt., which is indicated when the water content of the non-reductive drying gas is less than 150 p.p.m.v. on leaving the catalyst when gas flow rates of 100 to 200 s.c.f.h. per pound of catalyst and temperatures of 850 to 1000° F. are used.

Reduction of the hydrogenation metal oxides is generally accomplished with a hydrogen-containing gas at temperatures not higher than about 930° F. At temperatures above this the metallic halogen compound or complex disintegrates and sintering of the metal to catalytically inactive metallic crystallites occurs. Generally, reduction is effected at a temperature in the range of from 600 to 1000° F., although temperatures from 700–800° F. are preferred. Gas flow rates of 100 to 200 s.c.f.h. per pound of platinum-rhenium catalyst are suitable. Pressures from 50 to 400 p.s.i.a. are suitable.

EXAMPLE

To demonstrate the effectiveness of the halogenation procedure of the invention on catalysts which have been deactivated in a reforming process and subjected to carbon removal, a fresh catalyst containing 0.357% wt. platinum, 0.20% wt. rhenium and 0.9% wt. chlorine on alumina (Catalyst 1) was evaluated as a basis for comparison. This evaluation was carried out in a two-reactor, quasi-isothermal, semi-regenerative pilot plant. Operating conditions were 250 and 200 p.s.i.g., respectively, 7.0–8.0 hydrogen/oil molar ratio, 2.0 LHSV and temperatures as required to produce 100 Fl–0 debutanized octane number reformate. The feed used was a hydrotreated West Texas heavy straight run naphtha with addition of 5 p.p.m.v. water and 0.9 p.p.m.w. chloride (as chlorobenzene).

The activity (bed temperature) and selectivity ($C_5+$ yield) of the fresh catalyst under these operating conditions are shown in FIGS. 1 and 2 of the drawing as a function of catalyst age. This rhenium-promoted platinum catalyst was more active and stable than reforming catalysts containing only platinum as a hydrogenation component, the activity advantage reaching 45–50° F. weighted average bed temperature at 4.5 bbl./lb. (barrels/pound) catalyst age for the same feedstock. Up to 2.5 bbl./lb. catalyst age the platinum-rhenium (Pt-Re) catalyst was up to 0.5% v. (basis feed) less selective than a platinum-only catalyst. However, from 2.5 bbl./lb. it was at least 0.5% v. (basis feed) more selective than a platinum-only catalyst.

After the fresh catalyst had become deactivated in the preceding run, it was subjected to a conventional carbon burn-off. After evacuating and purging the reactor with nitrogen, 0.5% oxygen was added to the nitrogen stream which was passed over the catalyst at a rate of about 190 s.c.f.h./lb. The temperature was gradually increased from about 725° F. to 950° F. Substantially all the carbon was then removed by increasing the oxygen content of the nitrogen to 1.5% v. and maintaining the temperature at 950° F. for about five hours.

After the carbon removal step the oxygen content of the nitrogen was increased to 2.0% v. and the platinum-rhenium metals and/or alloy were redispersed by adding 2.2% v. water and 0.2 v. chlorine to the nitrogen until the catalyst chloride level was increased to about 1.0% wt. This step required about 45 minutes at which time oxygen, steam and chlorine were discontinued simultaneously. Gas hourly space velocities varied from 100 to 200 s.c.f.h./lb. at 100 p.s.i.g. The catalyst (Catalyst 2) was then dried at 100 p.s.i.g. and 900° F. with 100 s.c.f.h./lb. dry nitrogen until the water concentration in the exit gas was below 25 p.p.m.v., and reduced with dry hydrogen (100 s.c.f.h./lb.) for one hour at 100 p.s.i.g., and 700° F.

Catalyst 2 (conventional halogenation process) was then tested under the same operating conditions employed for fresh Catalyst 1. As shown in FIGS. 1 and 2, Catalyst 2 was somewhat less active (at about the same selectivity) than fresh catalyst. However, Catalyst 2 was considerably more active than fresh platinum-only catalyst tested under these same conditions. After about 5 bbl./lb. catalyst age, the activity and selectivity fell off rapidly compared to fresh Catalyst 1.

The catalyst was regenerated in the same manner and tested under essentially the same operating conditions for five cycles with approximately the same results after each regeneration. These runs were terminated after 8–9 bbls./lb. catalyst age because of poor performance of the regenerated catalyst.

After the fifth cycle Catalyst 3 (Improved Halogenation Process) was regenerated in the same manner as Catalyst 2 except for the halogenation step. Instead of discontinuing oxygen, steam and chlorine simultaneously from the nitrogen steam at the end of the halogenation step, steam and oxygen were discontinued after 40 minutes and chlorine was injected at the same rate for an additional five minutes. The catalyst was then dried and reduced as before and tested under the same operating conditions employed previously. FIGS. 1 and 2 show that activity and selectivity of reconditioned Catalyst 3 are equal to that of fresh Catalyst 1 up to about 5 bbl./lb. catalyst age, but are better than that of fresh catalyst after 5 bbl./lb. This clearly demonstrates the effectiveness of the improved halogenation process.

We claim as our invention:

1. In a process for reforming hydrocarbons by contact with a catalyst comprising a platinum group component, rhenium and halogen on a refractory oxide support under reforming conditions, said catalyst having been deactivated in the process and regenerated by contact with an oxygen-containing gas at temperatures to effect substantially complete carbon removal; contacted with a non-reducing gas containing oxygen at a partial pressure of 1.5 to 2.5 p.s.i.a., steam at a partial pressure of 1.0 to 5.0 p.s.i.a. and lower halogen at a partial pressure of 0.5 to 0.25 p.s.i.a. at a temperature of from 800 to 1000° F. to effect halogenation; contacted with a hydrogen-containing gas at temperatures from 600 to 1000° F. to dry the catalyst and reduce the platinum-rhenium metals to elemental form; the improvement which comprises discontinuing steam and oxygen from the halogenation gas when about 85% wt. of the desired halide content has been added and continuing to contact the catalyst with the lower halogen until the desired halogen content is obtained.

2. The process of claim 1 wherein substantially complete carbon removal from the deactivated catalyst is effected by contact with a non-reducing gas containing oxygen at a partial pressure of 0.1 to 2.5 p.s.i.a. at temperatures between 725 and 950° F.

3. The process of claim 1 wherein the catalyst is dried by contact with a non-reducing gas at a temperature of about 900° F. until the water content of the catalyst is below about 1.5% wt. and then reduced by contact with a hydrogen-containing gas at a temperature between 700 and 800° F.

4. The process of claim 1 wherein the catalyst comprises 0.2 to 0.9% wt. platinum group component and 0.01 to 5% wt. rhenium component, the refractory oxide support is alumina and the halogen is chlorine.

5. The process of claim 4 wherein the non-reducing gas flow rate is from 50 to 250 s.c.f.h. per pound of catalyst and the total system pressure is from 50 to 500 p.s.i.a.

6. The process of claim 5 wherein sufficient halogen is added to provide a finished catalyst content about 20% greater than that of fresh catalyst.

References Cited

UNITED STATES PATENTS

| | | | |
|---|---|---|---|
| 3,134,732 | 5/1964 | Kearby et al. | 208—140 |
| 3,201,355 | 8/1965 | Kimberlin, Jr. et al. | 208—140 |
| 3,496,096 | 2/1970 | Kluksdahl | 252—419 |
| 3,537,980 | 11/1970 | Kluksdahl | 252—415 |
| 3,558,479 | 1/1971 | Jacobson et al. | 208—139 |

DANIEL E. WYMAN, Primary Examiner

P. E. KONOPKA, Assistant Examiner

U.S. Cl. X.R.

252—415, 416